United States Patent Office 3,036,626
Patented May 29, 1962

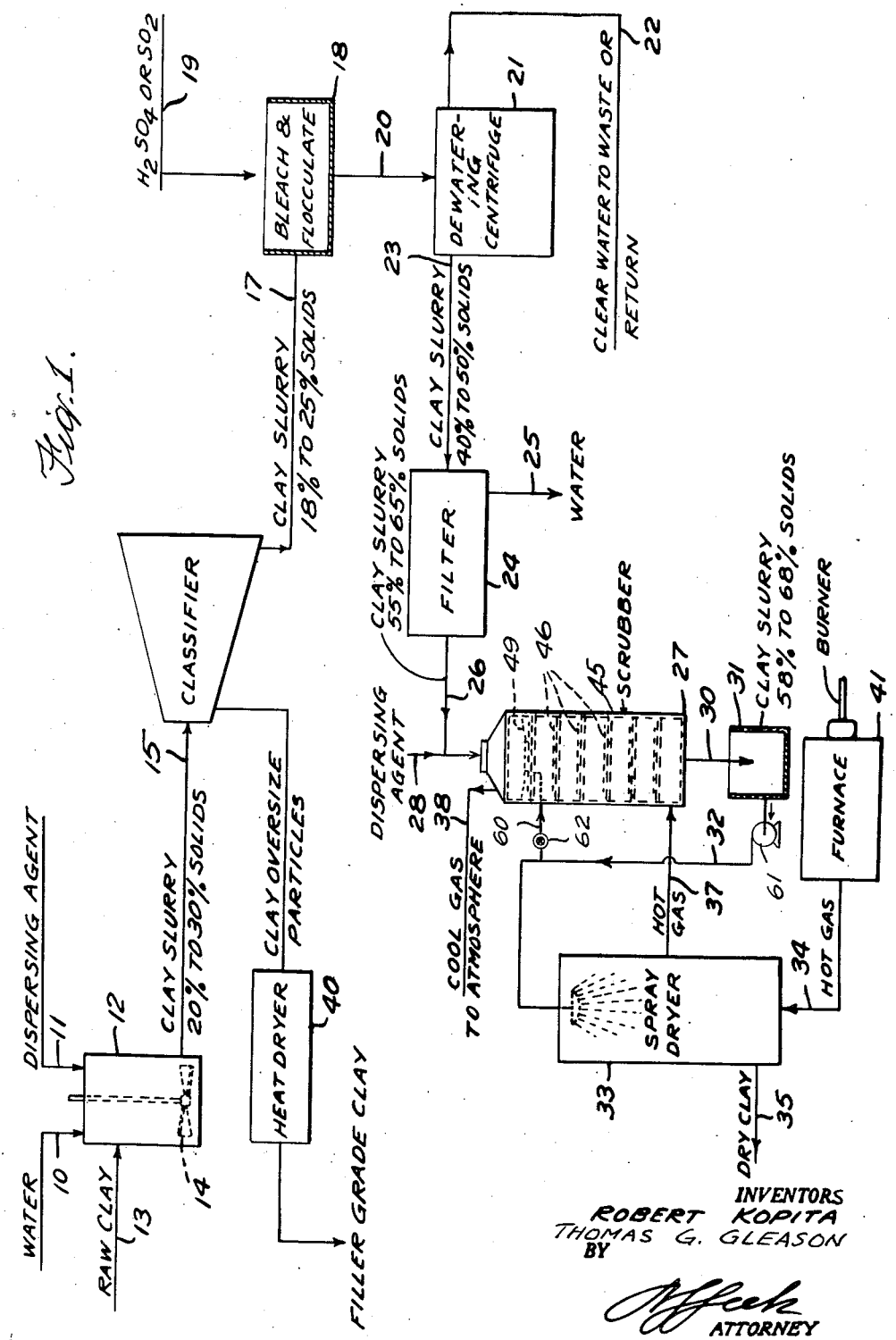

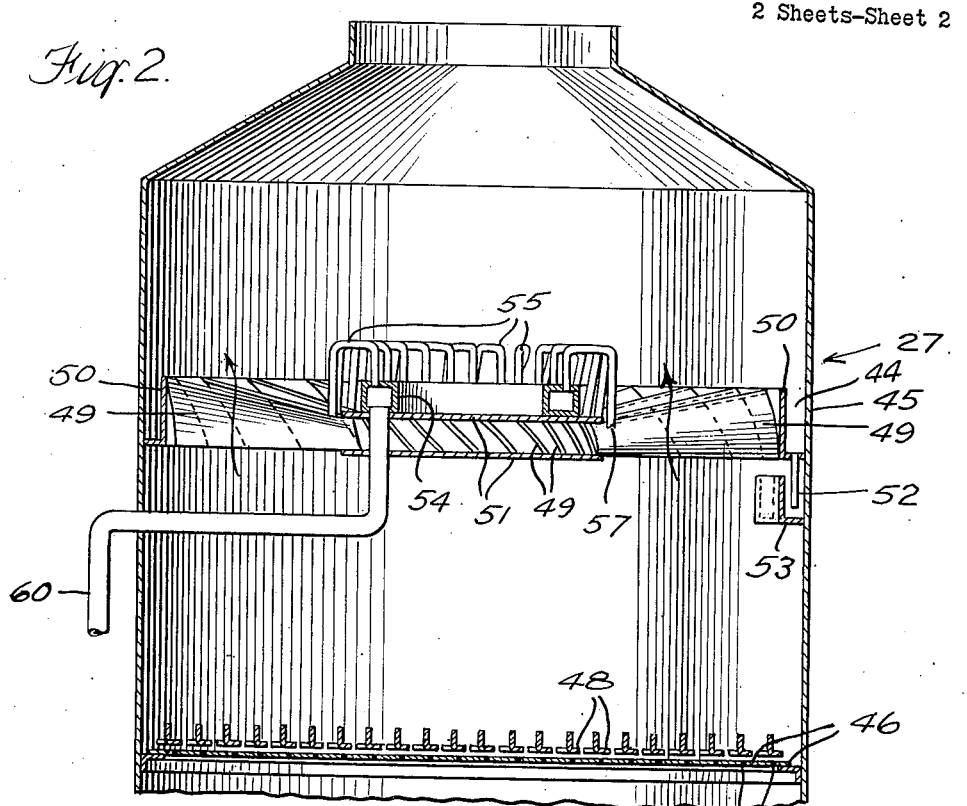
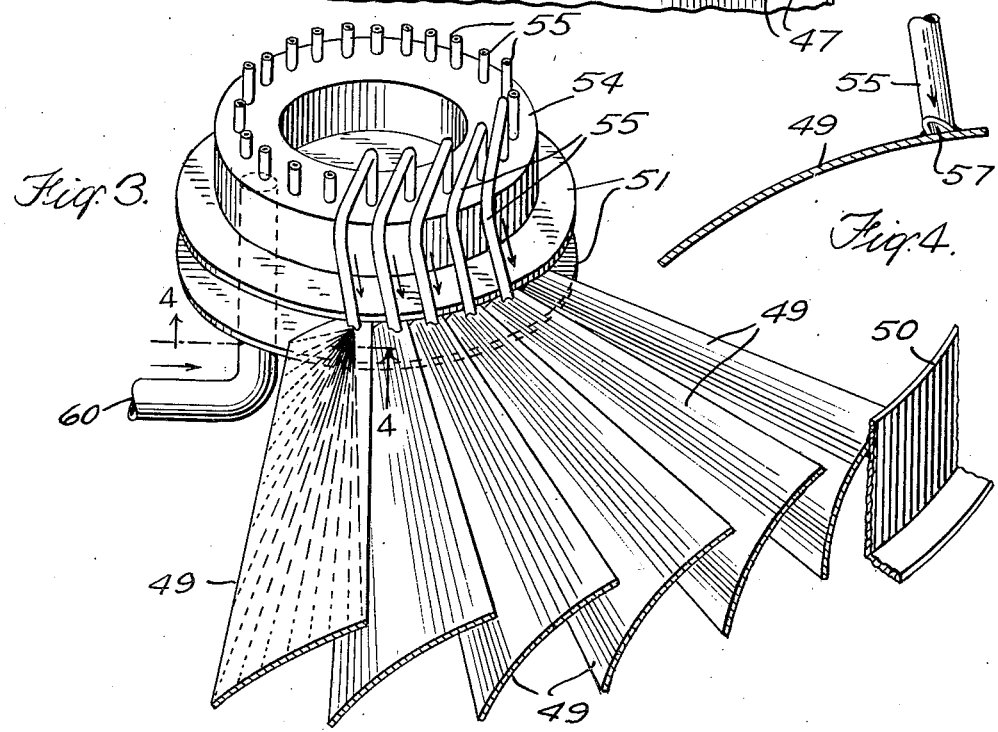

3,036,626
PARTICULATE MATTER RECOVERY SYSTEM
Robert Kopita, Plainfield, N.J., and Thomas G. Gleason, Manhasset, N.Y., assignors to Peabody Engineering Corporation, New York, N.Y., a corporation of New York
Filed Mar. 5, 1959, Ser. No. 797,544
2 Claims. (Cl. 159—4)

This invention relates to a system for recovering clay from a clay slurry and has for an object to provide a system of the above type having novel and improved characteristics.

This application is a continuation-in-part of copending application Serial No. 603,436 filed August 10, 1956, now abandoned.

Another object is to provide in such a system means to recover heat from the exhaust gases from the dryer thereby improving thermal efficiency.

Another object is to increase the capacity of a given dryer.

Another object is to strip particulate matter from such exhaust gases and to improve the efficiency of the particulate matter concentration.

Another object is to prevent clay particles from being deposited on the scrubber parts and interfering with the operation thereof.

Other objects and advantages will be apparent as the nature of the invention is more fully disclosed.

The invention will be better understood by referring to the following description, taken in connection with the accompanying drawings in which a specific embodiment has been shown for purposes of illustration.

In the drawings:

FIG. 1 is a schematic diagram illustrating a system embodying the present invention;

FIG. 2 is a vertical section through the upper portion of a scrubber embodying the invention;

FIG. 3 is a fragmentary perspective view of a portion of the scrubber on a larger scale; and FIG. 4 is a vertical section taken on the line 4—4 of FIG. 3, but on a larger scale.

Referring to the drawings, the system is shown as adapted to recover clay by evaporation of liquid from a clay slurry. A slurry of clay to be classified and dried is first made by adding water from a line 10 and a dispersing agent from a line 11 into a mixer 12 to which raw clay is admitted from a line 13. The mixer may be of any standard type and may include a mixing paddle 14. The mixer is adapted to form a clay slurry of, for example, 20% to 30% solids content.

This slurry is led by line 15 to a classifier or setting tank wherein layer particles are settled out and discharged to heat dryer 40 to leave a slurry having, for example, 18% to 25% solids content.

This last slurry is led by a line 17 to a bleach tank 18 to which a bleaching agent, such as $H_2SO_4$ or $SO_2$ is supplied from a line 19. The flocculate is led from the tank 18 by line 20 to a dewatering apparatus 21 such as a centrifuge.

The clean water is removed from the centrifuge 21 by a line 22 and the slurry, which now has a solids content of 40% to 50%, is fed by line 23 to a filter 24 in which water is removed and discharged through line 25, to leave a slurry having a solids content of 55% to 65%.

This last slurry is fed through a line 26 to a scrubber, such as a tower 27, which is of the type having one or more perforated trays over which the liquid slurry flows in contact with a hot gas which bubbles through the liquid and impinges upon the baffles above each tray so that any solid particles in the gas stream are entrapped in the liquid and at the same time the liquid is heated by contact and recovers heat from the hot gas. The tower 27 may be of the type shown in the Graham Patent No. 2,457,658 dated December 28, 1948.

More specifically, the scrubber 27 comprises a shell 45 having one or more bubble trays 46 provided with perforations 47 registering with baffles 48. Above the upper tray 46 is disposed a water eliminator stage comprising a set of radial vanes 49 attached at their outer ends to an angle member 50 forming a channel 44 with the shell 45, and held at their inner ends between a pair of plates 51. The overflow from the channel 44 is effected through a pipe 52, the lower end of which is submerged in a water seal in a pocket 53.

A dispersing agent may be introduced into the tower 27 by a line 28.

The clay slurry after passing through the scrubber and having a solids content of 58% to 68% is removed from the tower 27 through a line 30 to a receiver 31 from which it is fed by a line 32 into a spray dryer 33.

The slurry inlet pipe 26 extends through the shell 45 to supply the slurry on to the upper tray 46. A portion of the slurry in the line 32 is recycled by a line 60 connected between the pipe 32 and a manifold ring 54 from which a set of gooseneck pipes 55 extend to the upper surface of each vane 49. A pump 61 is included in the line 32 for circulating the slurry through the line 32 and the pipe 60 and the amount of slurry recycled through the line 60 is controlled by a valve 62. The end of each pipe 55 is attached to the upper convex surface of a vane 49 and is formed with an opening 57 to discharge slurry onto the upper surface of the vane.

The slurry thus introduced washes the upper surfaces of the vanes and prevents any deposit of clay from building up on the vanes. Also the vanes are disposed close enough to the upper tray 46 so that their under surface is washed by the liquid entrained with the rising gases. In this way the tendency of the clay to build up on the vanes and clog the operation of the scrubber is eliminated.

As an alternative, selected portions of the incoming slurry from pipe 26 may be fed to the manifold ring 54 for washing the vanes instead of the recycled slurry from the pipe 32, although the more concentrated slurry from the pipe 32 is preferred due to its lower water content.

Hot gases, produced by burning fuel in furnace 41 for the purpose of drying the slurry are introduced into the dryer 33 by line 34 and the dried classified clay is removed through line 35.

The hot gases serve to evaporate the water from the slurry in the dryer 33 and may pick up some clay dust particles. These gases and the entrained dust particles are exhausted through the line 37 by which they are supplied to the tower 27 as the heating agent for the slurry therein. As the gases bubble through the trays 46 in the tower 27 the clay dust particles are stripped out of the gases and the superheat in the gases is thus recovered and serves to preheat the slurry before it enters the spray dryer. The stripped and cooled gases are exhausted from the tower 27 by line 38.

The heat recovered in the tower 27 may be equivalent to as much as 15% of the heat of the fuel used to produce hot gases for the system. In addition the clay dust which is stripped from the exhaust gases from the dryer is converted in the dryer to dry clay with a corresponding increase in yield.

What is claimed is:

1. A scrubber comprising a plurality of bubble trays, means causing a liquid to be treated to flow as a liquid layer in succession over said bubble trays, means bubbling a gas with entrained particles upwardly through said liquid layers for removing said particles from said gases and transferring heat to said liquid, a final stripping zone disposed above the upper bubble tray comprising a set of stationary radial vanes adapted to cause rotation of the gases as they pass upwardly therebetween and thereover, said vanes having under surfaces disposed adjacent the upper tray whereby the under surfaces of said vanes are washed by the entrained liquid which is caused to impinge thereon by said gases, a discharge pipe terminating adjacent the upper surface of each of said vanes having a discharge opening positioned to discharge a liquid substantially parallel to and over the upper surface of said vane, a manifold connected to supply liquid to all of said pipes and a connection to supply to said manifold a portion of the liquid being treated in said scrubber for thereby washing the upper surfaces of said vanes with said liquid to prevent the accumulation of solid particles.

2. In a scrubber as set forth in claim 1 means collecting the liquid below the lowermost bubble tray and means including a pipe and a pump connected between said last means and said manifold for re-cycling a portion of the liquid from said scrubber over said vanes.

References Cited in the file of this patent

UNITED STATES PATENTS

| | | |
|---|---|---|
| 621,718 | Seymour | Mar. 21, 1899 |
| 2,056,266 | Goodell | Oct. 6, 1936 |
| 2,157,070 | Coey | May 2, 1937 |
| 2,327,039 | Heath | Aug. 17, 1943 |
| 2,343,027 | Ramen | Feb. 29, 1944 |
| 2,603,464 | Nevins et al. | July 15, 1952 |
| 2,684,713 | Vincent | July 27, 1954 |
| 2,818,917 | Vincent | Jan. 7, 1958 |
| 2,879,838 | Flynt et al. | Mar. 31, 1959 |